F. PHILIPPS.
VEGETABLE AND FRUIT DISPENSER.
APPLICATION FILED MAR. 26, 1921.
1,388,198.
Patented Aug. 23, 1921.
2 SHEETS—SHEET 1.
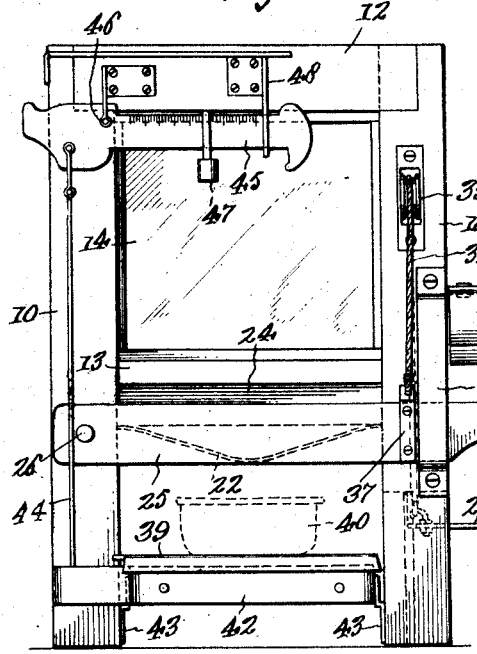
Fig. 1.
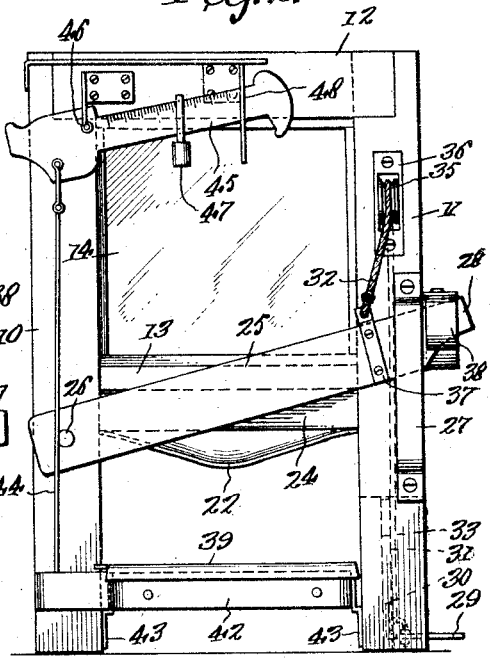
Fig. 2.
Fig. 3.
Inventor
Frank Philipps
by
Mawhinney & Mawhinney
Attorneys F. PHILIPPS.
VEGETABLE AND FRUIT DISPENSER.
APPLICATION FILED MAR. 26, 1921.
1,388,198.
Patented Aug. 23, 1921
2 SHEETS—SHEET 2.
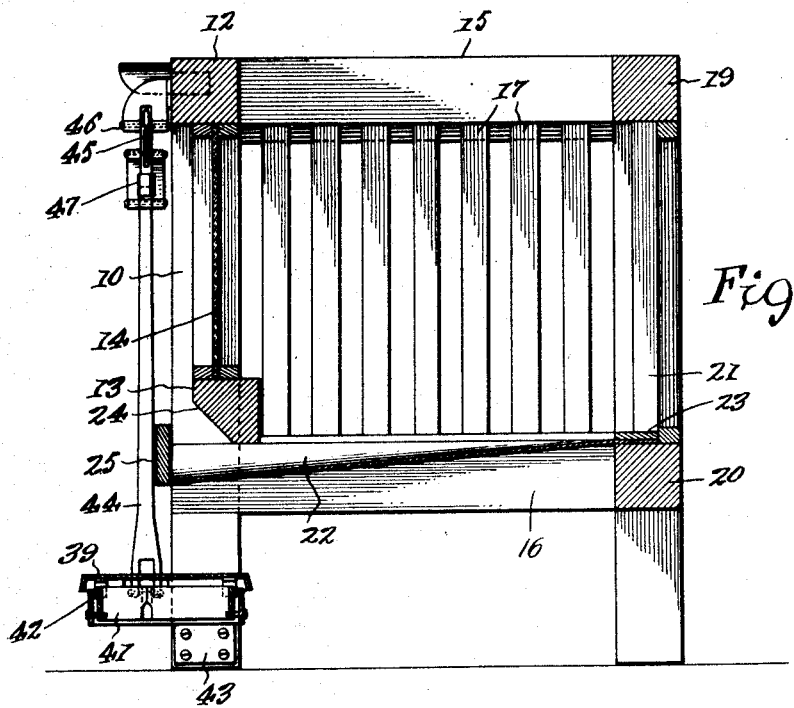
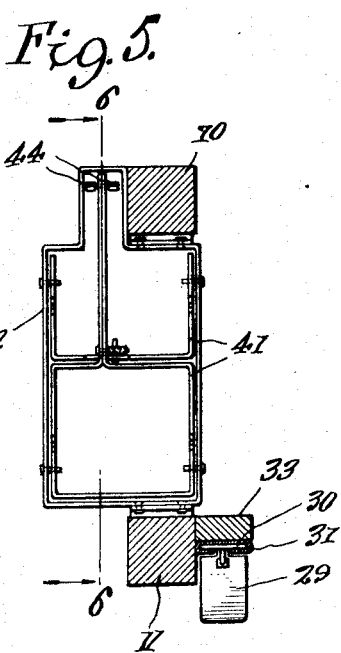
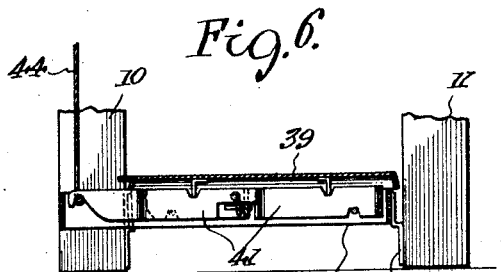
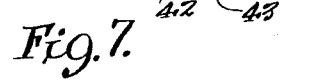
Inventor
Frank Philipps.
By Mawhinney & Mawhinney
Attorneys.

UNITED STATES PATENT OFFICE.

FRANK PHILIPPS, OF HAMMOND, INDIANA.

VEGETABLE AND FRUIT DISPENSER.

1,388,198.　　　　　Specification of Letters Patent.　　Patented Aug. 23, 1921.

Application filed March 26, 1921. Serial No. 455,809.

*To all whom it may concern:*

Be it known that FRANK PHILIPPS, a citizen of the United States, residing at Hammond, in the county of Lake and State of Indiana, has invented certain new and useful Improvements in Vegetable and Fruit Dispensers, of which the following is a specification.

The present invention relates to store furniture, and particularly to a device by use of which vegetables, fruit and like goods may be quickly and easily dispensed to customers.

An object of the present invention is to provide a device of this character which is not only adapted to use by the salesman for quickly measuring out desired quantities of fruit and vegetables, but which may also be employed in stores of the character where the customers wait on themselves, as the device provides a ready means for supporting a container, means for permitting the fruit or vegetables to be delivered to the container, and means for determining the weight or quantity of the goods deposited in the container.

Another object of the invention is to provide a device of this character which is of relatively compact and strong construction so that it is capable of withstanding considerable wear and hard usage, and a device which may be easily kept in a sanitary condition and to which access may be readily had to the interior thereof for filling the same and for withdrawing its contents.

A further object of the invention is to provide an improved frame or body construction adapted to support and house in or protect various operating elements, and to support such elements in convenient position of access to the salesman or other party dispensing the goods, and which maintains the parts in close proximity to each other so that they may be quickly and easily operated without the exercise of undue care or skill.

A still further object of the invention is to provide a device which may be operated quickly and easily so as to save considerable time in the handling and weighing of fruit and vegetables, and a device which embodies various novel features which combined, produce a practical and economical dispenser both as to manufacture and use.

The above, and various other objects and advantages of this invention will in part be described in and in part understood from the following detailed description of the present preferred embodiment, the same being illustrated in the accompanying drawings, wherein:

Figure 1 is a front elevation of a vegetable and fruit dispenser constructed according to the present invention, the device being closed and a container shown as resting on the platform;

Fig. 2 is a similar view disclosing the dispenser open and illustrating the parts of the device when the platform is depressed or weighted down with the required quantity of the goods;

Fig. 3 is a side elevation of the device in the position of Fig. 1, parts of the same being shown in section;

Fig. 4 is a vertical longitudinal section taken substantially centrally through the device in the position of Fig. 1;

Fig. 5 is a horizontal section taken substantially on the line 5—5 of Fig. 3 and looking downwardly in the direction indicated by the arrows;

Fig. 6 is a vertical section taken through the structure illustrated in Fig. 5 on the line 6—6 thereof, and in the direction indicated by the arrows; and Fig. 7 is a detail plan view of the underside of the scale platform.

Referring to the drawings, wherein like parts are designated by similar numerals of reference throughout the several views, the body part or frame of the device comprises a pair of forward uprights or standards 10 and 11, connected together at their upper ends by a front cross piece 12 and reinforced by a second cross piece 13 joining the uprights 10 and 11 intermediate their ends.

The space between the cross pieces 12 and 13, and the standards 10 and 11 is preferably closed in by a transparent panel 14, although any other suitable closure may be employed. The front portion of the frame thus formed, constitutes a support for a pair of sides. Each side is constructed of a top rail 15 and a bottom rail 16, the rails supporting a plurality of slats 17 or the like, which extend between the rails and form the body of the side, and permit inspection of the contents of the body through the side.

The top rail 15 is joined to the front section at its upper end while the bottom rail 16 is joined to front section at a point below the cross piece 13. The rear end of the platform comprises a pair of standards, which are secured to the rear ends of the top and bottom rails 15 and 16, and which are interbraced by a top brace 19 and a lower or intermediate brace 20. The brace 19 is connected to the tops of the standards 18, while the brace 20 preferably lies in the horizontal plane of the side rails 16, and below the forward cross brace 13. The rear wall or portion of the structure may also be closed in by slats or bars 21, forming a grating for holding the contents in the body and at the same time permitting the inspection of the contents from outside the body.

The parts, thus described, may of course be made of any suitable material, but at present, they are constructed of wood as the latter is found to be the most practical and economical. A sheet metal bottom 22 is provided. The rear end of the bottom 22 is secured by a clamping strip 23 upon the upper face or edge of the rear cross brace 20. The lateral marginal edges of the bottom 22 are secured by lateral extensions of the clamping strip 23 to the upper edges or faces of the side rails 16, so as to completely inclose the lower end of the body.

The intermediate portion of the sheet metal body 22 is depressed or arched downwardly, and slopes uniformly from the rear cross brace 20 to the forward edge of the bottom 22, which bottom projects forwardly beneath the front cross brace 13 to provide a trough or feeding mouth of a predetermined size downwardly through which the fruit and vegetables may roll when released. The forward lower corner of the cross piece 13 is preferably beveled or cut away to provide an inwardly and downwardly sloping face 24, which leads to the troughed bottom 22, to permit viewing of the contents of the trough and also easy access of the hand for picking out one or more of the articles to be dispensed, should it be found necessary to add an additional article for completing the weight. This inclined face 24 also provides a hopper or opening through which articles may be returned to the spout or bottom 22, should there be overflow incident to the failure of shutting off the flow of the articles from the spout.

A gate 25 is mounted on the body frame at the forward end of the bottom or spout and is adapted to control the flow of the articles or material from the spout. This gate 25 comprises a flat strip or board pivoted at 26 against the forward side of the upright 10 at one side of the bottom 22 and the strip 25 is adapted to extend in a general horizontal direction across the front of the body, and is adapted to swing upon its pivot 26 within the limits of a strap or guard 27 which is secured to the opposite front standard or upright 11. The guard 27 is preferably of substantially loop shape with its ends screwed or otherwise secured against the outer face of the upright 11, and the gate or strip 25 is of sufficient length to project from the strap 27 and beyond the outer edge of the upright 11 to form a handle 28 by means of which the gate 25 may swing down into the lower end of the strap 27, for closing the gate.

From Fig. 4 it will be noted that the top of the gate 25 terminates in spaced relation from and also below the plane of the upper portion of the cross brace 13, so that ample space is provided between the top of the gate 25 and the inclined face 24 to receive the hand for withdrawing or replacing articles as is found necessary.

To permit the quick and easy opening of the gate 25, particularly when both hands are occupied in the carrying of bundles or holding a receptacle in proper position for receiving the articles, a pedal or foot lever 29 is provided and is located upon the standard 11 at the side thereof so that the person dispensing the goods may stand at the front of the device and place the right foot on the pedal 29, depress it and thus open the gate 25.

This pedal 29 is provided with a substantially T-shaped head or shoe 30 upon its inner end, and the shoe or head is confined in a vertical guide 31 which is preferably in the form of a sheet metal strip overturned at its longitudinal edges, and with such edges closely spaced apart to form an undercut T-slot in which the shoe fits with the shank thereof projecting outwardly for supporting the pedal 29.

The pedal is connected by a flexible cord 32 with the outer or swinging end of the gate 25. The guide rail 31 is preferably secured against the outer face of a strip 33 secured upon the inner side of the front post 11, in position to permit the pedal 29 to project laterally beyond the post 11 a distance sufficient to receive the foot of the operator. The flexible cord 32 extends upwardly from the pedal 29 and through an opening 34 which is formed through the adjacent side rail 16 and thence upwardly and over a pair of pulleys 35 carried in a suitable block 36 seated in the upper part of the standard 11. The flexible cord 32 is trained over these pulleys 35 and carried downwardly at the forward side of the standard 11 and connected at its end by a strap 37 to the gate 25 at the inner side of the strap or guard 27.

Thus, depression of the pedal 29 swings the gate 25 into open position. For the purpose of holding the gate 25 in open position when desired, the standard 11 is provided at its outer side with a spring-retainer 38, which, as best shown in Fig. 3, comprises a strip of spring metal having its opposite ends rolled inwardly toward each other and with its extremities free to permit the flexing of said rolled extremities toward and from each other. These rolled portions of the retainer 38 are closely spaced apart to yieldingly receive therebetween the handle 28 of the gate, as the latter is swung into its raised position. The retainer 38 is of sufficient strength to support the gate in raised position and at the same time permits the releasing of the gate when slight pressure is brought to bear upon the handle 28 in a direction to close the gate.

Housed within the forward part of the body or frame of the device is a supporting platform 39. This platform extends between the lower end portions of the standards 10 and 11 and beneath the forward end of the bottom or spout 22 so that a basket, such as shown in dotted lines at 40 in Fig. 1, may be placed upon the platform and when there positioned, is in proper place to receive the articles or material as the same flow from the spout or bottom 22. The platform 39 is supported upon the lever mechanism 41 of a scale which is housed in a base 42, secured by straps 43 or the like to the inner sides of the uprights 10 and 11 for not only reinforcing the uprights, but also for housing and protecting the scale mechanism.

The lever 41 is connected by a link 44 to a scale beam 45 of approved construction, which is pivoted at 46 to the front side of the top cross brace 12 and in position over the platform 39. The scale beam 45 carries the usual adjustable weight 47 and other appurtenances for determining the different weights it is desired to place upon the platform 39. The cross brace 12 is also utilized for supporting a yoke bracket 48 which embraces the outer end of the scale beam 45 for limiting the rise and fall of the same.

It will be noted that the frame or body part of the dispenser is of such construction that it houses and supports the various parts of the dispensing and weighing apparatus, so that such parts not only afford a support and a protection, but are so positioned that they may be used for interbracing and reinforcing the frame of the device.

Another feature of the device as thus constructed, is that while the contents may in bulk be quickly and easily delivered to the basket or other container used, it admits of the return or of the individual picking out of one or more of the articles according to whether an excess amount has been delivered or whether the amount falls slightly short of the weight desired.

In use, the person dispensing the goods places a container 40 on the platform 39. The weight 47 is then adjusted on the scale beam to the indication opposite the desired weight. This having been done, the person then places the foot on the pedal 29 and forces the latter down in its guide 30. This action draws on the cord 32 and swings the gate 25 into its raised open position.

The retainer 38 grasps the gate 25 and holds it in such open position so that the operator may release the foot. As soon as the quantity of goods has flowed from the spout 22 into the container 40 to an amount sufficient to swing the scale beam 45, the operator then quickly presses down upon the handle 28 of the gate to close the latter.

Should the gate not be closed at the proper time, and too much material or too many articles were delivered to the container 40, the person may easily pick out a few of the articles from the container to lighten the weight therein and toss such articles back into the spout or bottom 22 through the passage 24.

On the other hand, if the quantity in the container 40 does not come up to the desired weight, the operator may easily insert the hand in passage 24 and lift out one or more of the articles, as is found necessary to make up the deficiency in the weight. The device is thus adapted for practical usage and may also be used for determining the exact weights as well as handling the bulks in a quick and satisfactory manner.

It is of course understood that various changes and modifications may be made in the details of construction and design of the above specifically described embodiment without departing from the spirit of the invention, such changes and modifications being restricted only by the scope of the following claims.

What is claimed is:

1. In a dispensing device, a hollow body adapted to receive articles to be dispensed and provided with a forwardly inclined bottom forming a chute, a gate closing the outer end of the chute, a pedal mounted upon the side of the body and connected to the gate for swinging the same into open position upon depression of the pedal, and a scale platform mounted within the forward end of the body portion beneath said gate for supporting a container in position to receive articles from the spout.

2. In an article dispenser, a hollow body portion having an outlet spout at its forward end, a gate closing the forward end of the spout, a pedal mounted upon the side of the body portion and connected to said gate and adapted to swing the latter into open position when the pedal is depressed, means for yieldingly holding the gate in open position, said gate being adapted to be manually released upon delivery of the required amount of material from the spout, and a scale platform housed within and supported by the forward end of said body portion for supporting a container beneath the spout.

3. In an article dispenser, a hollow body portion adapted to receive material in bulk, and having a forwardly inclined bottom forming a spout, a gate pivoted upon the forward end of the body portion at one side thereof and extending across the forward end of said spout for closing the same, a pedal mounted upon said body portion at the other side thereof, a connection between said pedal and said gate for swinging the latter into open position when the pedal is depressed, and a scale platform mounted within the lower end of said body portion beneath the gate for supporting a container in proper position to receive articles from the spout.

4. In an article dispenser, a body portion comprising front and rear pairs of uprights, top and intermediate braces arranged between said pairs of uprights for interbracing the same, top and bottom side rails joining said uprights to provide a hollow body adapted to receive articles to be dispensed, an inclined bottom carried between the uprights and said rails and inclined forwardly and downwardly to form a spout adapted to deliver material beneath an intermediate brace at the front of the body, a gate pivoted at one end to one of the forward uprights and the gate extending across the forward end of said bottom to close the spout, a vertically slidable pedal mounted upon the opposite forward upright and having connection with the free end of said gate for swinging the latter upwardly when the pedal is depressed, and a weighing scale mounted between and supported from said forward uprights, whereby said scale is protected between the uprights and whereby the platform of the scale may be supported in position to receive a container for articles delivered from the spout.

5. In an article dispenser, a hollow body portion adapted to receive articles in bulk and having a forwardly inclined delivery spout at its forward end, a cross brace in the forward end of said body portion spaced above the bottom of the spout and having a forwardly and downwardly inclined front face providing a passage leading down into the spout, a gate mounted upon the forward end of the body portion and extending across the forward end of the spout in spaced relation to said cross brace to permit insertion and removal of articles through said space into and from the spout, means for swinging the gate into open and closed positions, and a scale platform mounted in the forward end of said body portion beneath said gate.

6. In a dispensing device for articles, a hollow body portion adapted to receive articles in bulk, and provided with a forwardly and downwardly inclined delivery spout, the front wall of said body portion having a lower cross brace spaced above said spout to permit a passage beneath the cross brace through which the articles are adapted to flow in a restricted stream, a gate pivotally mounted upon the forward end of the body portion and adapted to extend across the forward end of said spout to check the flow of articles therefrom, said gate being spaced forwardly from said cross brace whereby to provide between the gate and the cross brace a passage by means of which access may be readily gained to the spout when the gate is closed for removing articles from the spout and for replacing the articles therein, and a support carried in the forward end of the body portion beneath the open end of the spout for maintaining a container in proper position for receiving the bulk of material when the gate is open.

FRANK PHILIPPS.